United States Patent [19]
Bergkvist et al.

[11] Patent Number: 6,091,958
[45] Date of Patent: Jul. 18, 2000

[54] MOBILE STATIONS' GEOGRAPHICAL POSITION DETERMINATION, METHOD AND ARRANGEMENT

[75] Inventors: Bengt Bergkvist, Järfälla; Roland Bodin, Spånga, both of Sweden

[73] Assignee: Telefonaktiebolaget LM Ericsson, Stockholm, Sweden

[21] Appl. No.: 09/023,163

[22] Filed: Feb. 13, 1998

[30] Foreign Application Priority Data

Feb. 14, 1997 [SE] Sweden .................................. 9700522

[51] Int. Cl.⁷ ...................................................... H04Q 7/20
[52] U.S. Cl. ............................ 455/456; 455/466; 455/445
[58] Field of Search .................................. 455/456, 445, 455/466, 432, 433, 560

[56] References Cited

U.S. PATENT DOCUMENTS

| | | | |
|---|---|---|---|
| 5,878,347 | 3/1999 | Joensuu et al. | 455/445 |
| 5,878,351 | 3/1999 | Alanara et al. | 455/466 |
| 5,878,397 | 3/1999 | Stille et al. | 455/466 |
| 5,915,222 | 6/1999 | Olsson et al. | 455/445 |
| 5,960,355 | 9/1999 | Ekman et al. | 455/456 |

FOREIGN PATENT DOCUMENTS

| | | |
|---|---|---|
| 651586 | 5/1995 | European Pat. Off. . |
| 19520632 | 12/1996 | Germany . |
| WO97/05752 | 2/1997 | WIPO . |
| WO97/30360 | 8/1997 | WIPO . |
| WO98/15150 | 4/1998 | WIPO . |

OTHER PUBLICATIONS

International–Type Search Report re SE 97/00201 Date of mailing of international–type search report: Nov. 14, 1997.

*Primary Examiner*—Reinhard J. Eisenzopf
*Assistant Examiner*—Eliseo Ramos-Feliciano
*Attorney, Agent, or Firm*—Burns, Doane, Swecker & Mathis, L.L.P.

[57] ABSTRACT

The present invention relates to a method of sending to an unknown switching centre that serves a given mobile station a command concerning said mobile station. The command is sent by using a previously known short message service, e.g. SMS in the GSM-system. The command may constitute a request for the switching centre to determine the position of the mobile station and is sent from a positioning node outside the mobile communications system. The invention also relates to a method of sending data from the switching centre to the positioning node. The invention also relates to a switching centre and also to a system for carrying out the method.

25 Claims, 6 Drawing Sheets

MOBILE STATIONS' GEOGRAPHICAL POSITION DETERMINATION, METHOD AND ARRANGEMENT

FIELD OF INVENTION

The present invention relates to an arrangement and to a method for transferring information in a telecommunications system, and then particularly a telecommunications system that includes a mobile communications system.

BACKGROUND OF THE INVENTION

There are a number of patent specifications which describe how the geographical position of a mobile station could be established with the aid of a mobile communications system. In those patent specifications that describe how the position of a mobile station could be determined with relatively good precision, the actual measuring procedure itself is the essential problem. The measuring procedure determines the distance between a mobile station and one or more radio base stations. Normally, the distance between the mobile station and at least three base stations is measured. When the geographical positions of the base stations are known, the position of the mobile station can then be determined in accordance with the triangulation method. These patent specifications can be divided into two groups of which those specifications in one group deal with uplink measuring processes, i.e. in the base station, and the other group deals with downlink measuring processes, i.e. in the mobile station.

SE 9603561-3 is a patent specification that belongs to the first group. This patent specification describes how the distances between the mobile station and a number of base stations are determined by measuring the wave propagation delay. This delay is measured in a second of the base stations, when the mobile station during an established connection with a first base station makes access to this second base station, such as in the case of a typical handover. The transmission time point of the transmitted access signal is not adapted to compensate for the wave propagation delay and therefore arrives late at the second base station in relation to the correct time position. This delay, i.e. propagation delay, is measured by the radio base station, whereafter the transfer is interrupted and the mobile station renews the connection with the first base station. The patent specification does not describe how the positioning procedure shall be initiated or which node coordinates and controls the measuring process. The patent specification mentions that positional data is transferred to a positioning node, where the position of the mobile station is established.

Swedish Patent Specification SE 96005772 is an example of those patent specifications that belong to the second group, i.e. the group in which the mobile station performs the measuring process. Subsequent to having measured the time delay of signals from several base stations, the mobile station sends the measured values together with the identities of the base stations to a positioning node, where the position of the mobile station is calculated.

Both of the aforementioned patent specifications teach a solution to the problem of performing a measuring process for determining the position of a mobile station. However, more problems than the problem of the actual measuring procedure must be solved in order to be able to offer a positioning service in a mobile communications system to a large group of users. One such problem which none of the aforesaid patent specifications provides a solution is how the positioning procedure could be initiated upon request by a user. Another problem is how the positional data shall be transferred to the positioning node.

SUMMARY OF THE INVENTION

The present invention addresses the problem of finding upon request from a user a switching centre that serves a designated mobile station in order to transfer to this switching centre a command that applies to the designated mobile station.

This problem arises, for instance, when someone wishes to transfer from a service node that may be located outside the mobile communications system a specific command relating to measures concerning the designated mobile station to the switching centre that serves the mobile station, this switching centre being unknown to the service node. A further concrete example of the problem is a service node that offers the service of determining the geographical position of a mobile station. In order to be able to establish the geographical position, it is necessary to commence a positioning procedure in that part of the mobile communications system that manages the mobile station.

Consequently, the service node must be able to transfer a positioning command to the switching centre that serves the mobile station, in some way.

Another problem resides in transferring information from the switching centre that serves the mobile station back to the service node that sent an earlier command to said switching centre.

The object of the present invention is to enable a command to be sent from a service node, for instance positioning node outside the mobile communications system, to a switching centre which serves a chosen or designated mobile station and which is unknown to the node in a safe manner, said command being intended to initiate in the switching centre a procedure that concerns the mobile station.

The aforesaid problems are solved in accordance with the present invention by sending the command to be transferred to an unknown switching centre that serves a selected mobile station in the same way as an earlier sent short message, for instance SMS in the GSM-system. The command is separated from other short messages, by being slightly modified and sent from a service node that is intended to send the command to the switching centre. The service node is either located outside the mobile communications system or constitutes a part of that switching centre in the mobile communications system which constitutes a boundary to other telephone networks, hereinafter called the gateway switch. The service node indicates the mobile station selected from the service node in the same way as a receiving mobile station is indicated in a typical transmission of a short message. When the gateway switch has received the command, the switch requests and obtains switching route information from a localizing register. With the aid of this information, the gateway switch is able to forward the command to the selected mobile station via the switching centre that serves the mobile station. When the command reaches the serving switching centre, the switching centre identifies the command as a message intended for the switching centre and stops forwarding of the command. The switching centre carries out the instructions in the command, e.g. initiates a positioning procedure.

Subsequent to having collected and compiled data that concerns the selected mobile station, e.g. its position, the serving switching centre is able to send this data back to the service node with the use of an earlier known confirmation of the short message received.

The switching centre may also send a message that is independent of a possibly received command, and to send data to the service node in said message. Although the message is created and sent by the switching centre, it coincides in other respects with an earlier known message created and sent by the mobile station.

The aforesaid modification that distinguishes the command to the serving switching centre from other short messages includes the insertion of a symbol in one of the message word information fields.

The symbol is inserted, for instance, in a selected information field that belongs to a group of information fields which have earlier been intended to be read solely by the mobile station. According to this example, the serving switching centre must treat all incoming short messages as presumptive positioning commands and to decode the selected information field in respect of all short messages in order to discover any possible positioning command.

In another example, the symbol is inserted in a selected information field that belongs to a group of information fields which are read by the serving switching centre in an earlier known manner.

The present invention enables a service node to send a command concerning the selected mobile station to the switching centre that serves the mobile station. For instance, it is possible to locate the correct switching centre from a positioning node outside the mobile communications system and send a positioning command to this switching centre. The positioning command initiates in the serving switching centre the positioning procedure for determining the position of the selected mobile station. The measuring processes used in this respect may be any one of earlier known measuring methods.

One advantage is that the present invention can be implemented in an existing mobile communications system with only limited modification of existing functions.

Another advantage afforded by the present invention is that it is possible for the switching centre to process measuring data or other collected information, optionally together with confidential information, prior to forwarding the processed data.

The invention will now be described in more detail with reference to preferred embodiments thereof and also with reference to the accompanying drawings.

DESCRIPTION OF PREFERRED EMBODIMENTS

Figure 1:
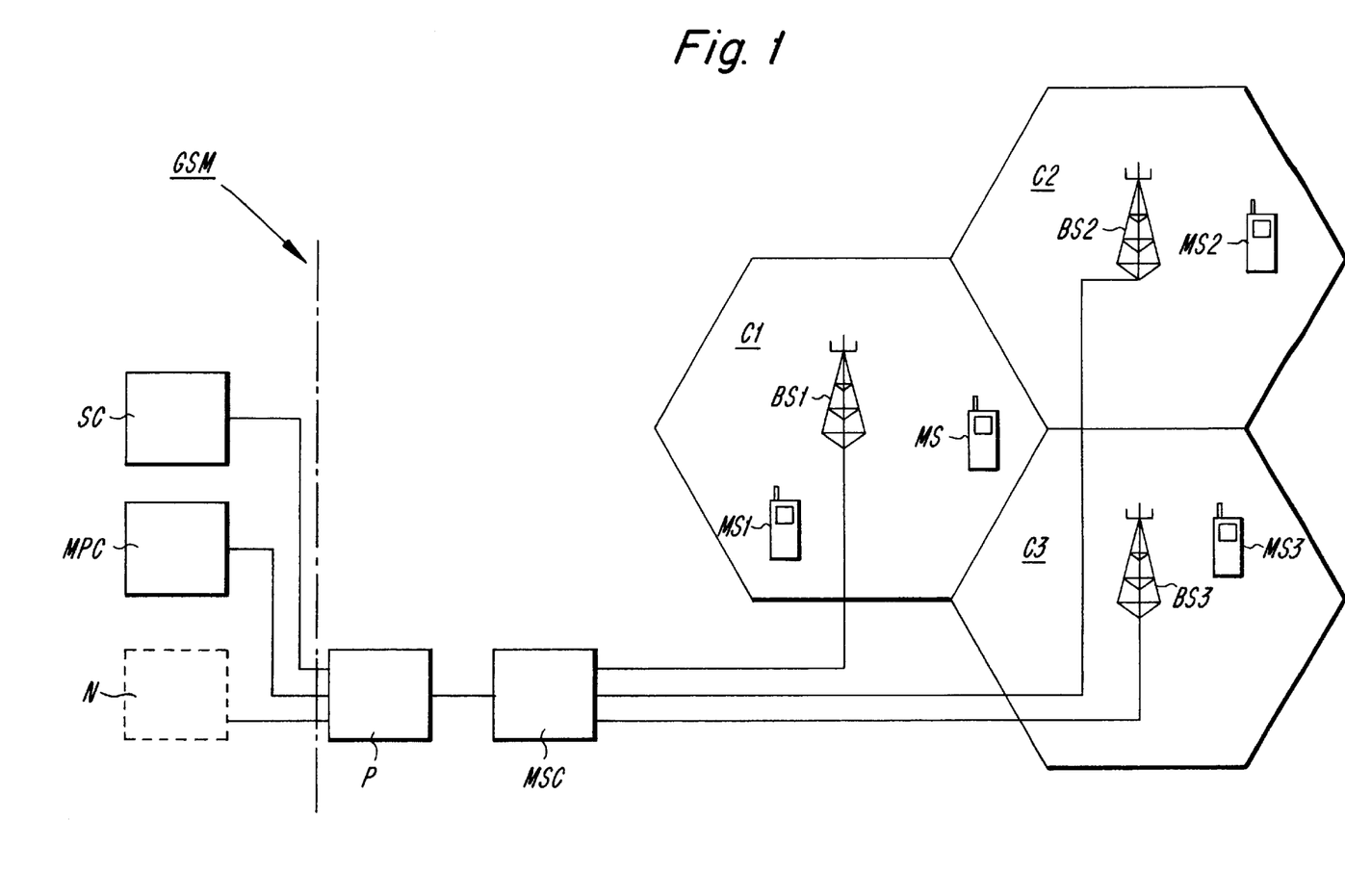
FIG. 1 is a view of a mobile communications system with geographic cells within which traffic is served by a base station.

The present invention is applied in a mobile communications system and in a telecommunications system. One such mobile communications system GSM is shown in FIG. 1. The mobile communications system GSM includes at least one gateway switching centre P through which connections with terminals externally of the mobile communications system are set-up. The mobile communications system includes at least one further switching centre MSC which is in communication with the gateway switching centre P. At least one base station system that includes a plurality of radio base stations BS1, BS2 and BS3 is coupled to the switching centre MSC. The mobile communications system also includes a number of mobile stations MS, MS1, MS2 and MS3. A radio base station BS1, BS2 and BS3 is available for setting-up a traffic connection with each of those mobile stations that are located within a certain geographical area, i.e. within a cell C1, C2 and C3. The base station BS1 thus serves those mobile stations that are located within a cell C1, for instance the mobile stations MS and MS1. The base station BS3 serves those mobile stations that are located in another cell C3, for instance the mobile station MS3. The total geographical area covered by the cells C1, C2 and C3 and within which radio connection with the mobile stations MS, MS1, MS2 and MS3 can be established is called the service area. The gateway switching centre has a subscriber register, for instance a home location register, connected thereto and obtains therefrom information so that incoming messages can be forwarded to the correct mobile station. This register is not shown in FIG. 1.

The present invention utilizes an existing short message service function existing in several mobile communications systems. This service is known as an SMS-service (Short Message Service) in the GSM-system. Embodiments of the invention will be described below with reference to the GSM-system. However, a brief explanation of how existing SMS-services function will be given first, so that the invention will be more readily understood.

SMS is a short character message sent between two parties. No circuit-coupled connection need be set-up and the transmission is unidirectional and communication between the users is comprised of the short message transmission.

Two types of SMS are found in the GSM-terminology, the one type of SMS being sent from a mobile station and the other being received by a mobile station. The counter-party in the transmission to/from the mobile station is always an SMS-service node SC (SM-Sc). This node is the connecting node when an SMS shall be sent between two mobile stations or between a user outside the mobile communications system and a mobile station.

Figure 2:
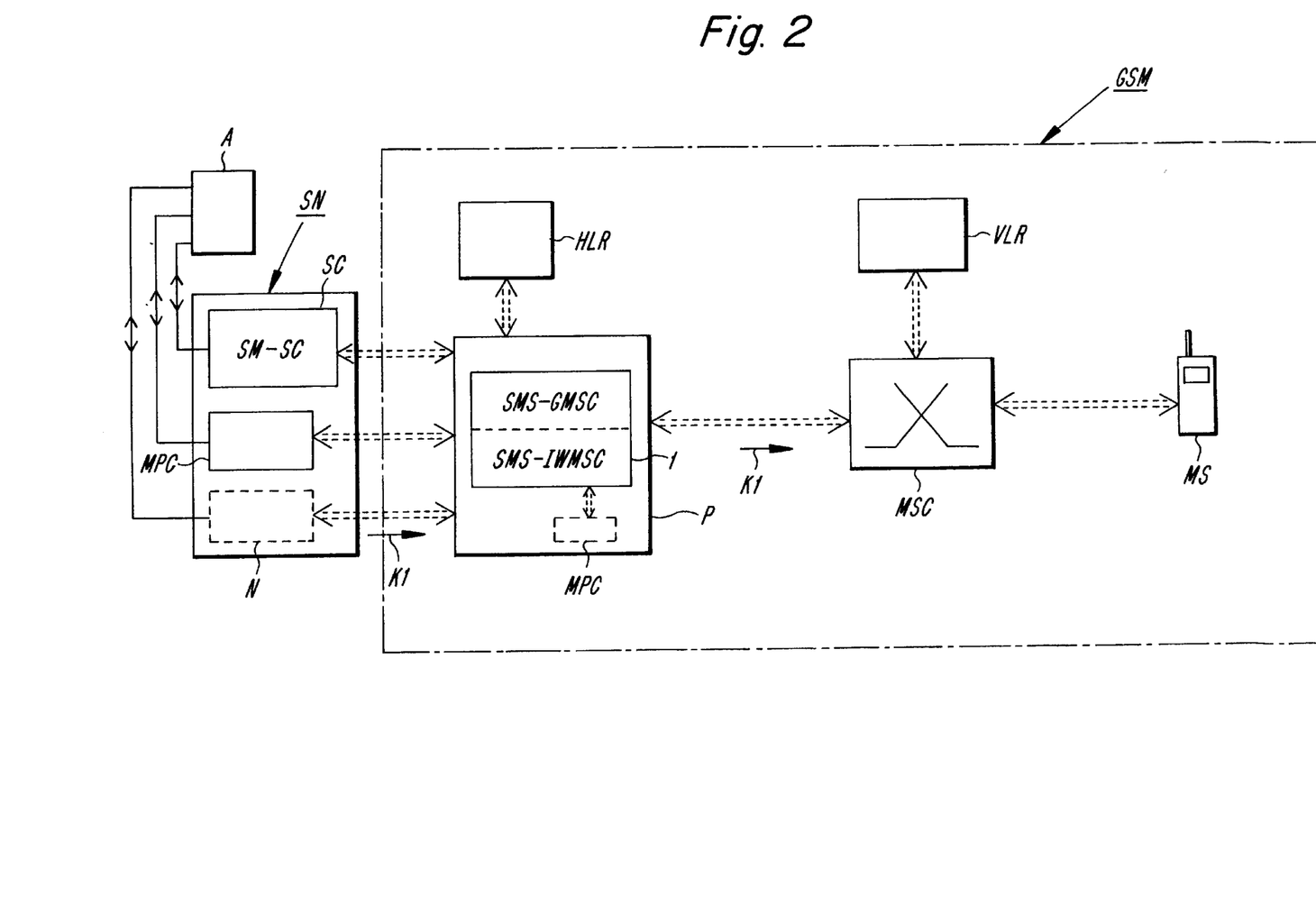
FIG. 2 is a block schematic illustrating nodes and signalling links for the known SMS-service in the GSM-system, and also a previously unknown positioning node.

FIG. 2 shows the SMS-service node SC and the mobile communications system GSM with those nodes and communication links that are involved in the transmission of an SMS-message. Also shown is an earlier unknown positioning node MPC, and an earlier unknown service node N, as later described in more detail. The SMS-service node SC, the positioning node MPC and the service node N can transmit the SMS-message to the mobile communications system GSM in response to an order from a user A, and the nodes SC, N and MPC can also receive an SMS-message sent from the mobile communications system GSM and intended for the user A. The SMS-service node SC, the positioning node MPC and the service node N have the common designation SN in FIG. 2. SN is the designation of a node that can send and receive SMS-messages, for instance the positioning node MPC.

The boundary of the GSM-system to other telephone systems is comprised of a gateway mobile switching centre (GMSC) referred to as a gateway switching centre P. The SMS-service node SC, the positioning node MPC and the service node N are connected to the GSM-system via the gateway switching centre P. In order to be able to forward SMS-messages between the GSM-system and the SMS-service node SC, it is necessary to provide the gateway switching centre P with an SMS-gateway 1. The SMS-gateway 1 is actually comprised of two parts referred to in GSM terminology as SMS-GMSC with respect to that part which receives SMS-messages from the SMS-service node SC, and SMS-IWMSC in respect of that part which sends SMS-messages to the SMS-service node SC. These two parts will be treated as one single part in the following description.

The GSM-system also includes a home location register (HLR) connected to the gateway switching centre P. The subscriber to a given subscription is always registered in such a register, for instance the subscriber owning the mobile station MS. The register HLR also contains data as to where the mobile station MS can be found in the GSM-system, by virtue of this data pointing to the mobile switching centre MSC that serves the mobile station at that moment in time. A visitor location register VLR is connected to the mobile switching centre MSC. The visitor location register VLR contains information as to the whereabouts of the mobile station MS in the base station systems.

The mobile services switching centre MSC uses the information in the visitor location register VLR to forward an SMS-message to the mobile station MS, among other things.

A user A located outside the GSM-system and wishing to send an SMS-message to a mobile station MS contacts the SMS-service node SC and discloses the mobile station identity MSISDN, and the message to be sent. The SMS-service node SC creates an SMS-packet SMS-deliver which contains information to be transferred to the user of the mobile station. In GSM terminology, the SMS-packet is known as SMS-TL SMS-deliver.

Figure 3:
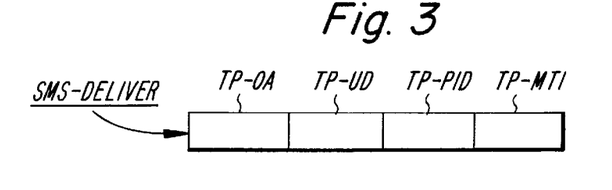
FIG. 3 is a principle diagram illustrating an SMS-packet and some of the information fields of the SMS-packet.

FIG. 3 is a principle diagrammatic illustration of the SMS-packet SMS-deliver, and some of its different information fields. An information field TP-UD contains user data, i.e. the message that the user A wishes to send. Another information field TP-OA contains the teleidentity of A, and a further information field TP-PID discloses for the mobile station which information protocol shall be used in the communication with the SMS-service node SC. Also shown in FIG. 2 is a further information field TP-MTI, this further field being described further on. An SMS-packet will include more information fields than those shown here when the information concerned refers to the GSM specification 03.40 9.2.2.1.

The SMS-packet SMS-deliver belongs to a functional layer SM-TL (Short Message Transfer Layer). The information belonging to this layer is sent transparently in accordance with a protocol SM-TP (Short Message Transgateway Protocol) from the SMS-service node SC to the mobile station MS. This takes place initially by the SMS-service node SC sending the SMS-packet to the SMS-gateway 1. Use of the function layer that lies beneath the function layer SM-TL is required for transmission to the SMS-gateway. These function layers are described in more detail below with reference to FIG. 4.

The SMS-gateway 1 receives the SMS-packet SMS-deliver and through the identity of the receiver, given as MSISDN, finds the home location register that registered the receiving subscriber. A request for routing information is sent by the SMS-gateway 1 to the home location register HLR. In GSM terminology, the request sent by the SMS-gateway 1 to the home location register HLR is called "MAP/C Send routing info for Short Message". The SMS-gateway 1 receives a response, unless the home location register HLR has not recorded that the subscriber cannot be reached. This response is called in GSM terminology "MAP/C Send Routing Info For Short Message Result". The response discloses that it is the switching centre MSC that serves the mobile station MS and that the switching MSC is connected to the visitor location register VLR.

The SMS-gateway 1 then forwards the SMS-packet SMS-deliver to the mobile switching centre MSC. This packet transfer is effected with the aid of what is known as Signal System No. 7 in a telecontext. The serving switching centre forwards the SMS-packet SMS-deliver to the mobile station MS. In order for this to take place, it is necessary that a signalling connection has been established with the mobile station MS. Such a connection is found when a typical circuit-coupled connection is established and the SMS-packet can thus be sent whilst a call is in progress, for instance. If no signalling connection has been established, such a connection is established for transmission of the SMS-packet.

Figure 4:
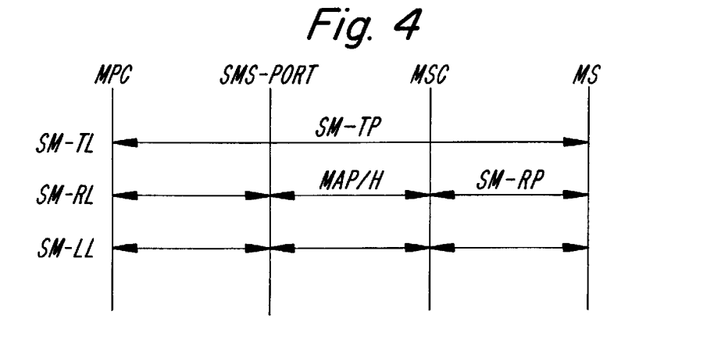
FIG. 4 is a diagrammatic illustration of function layers used by the SMS-service, some protocols used when transmitting information belonging to a given layer, and those nodes in the mobile communications system to which the information is sent.

FIG. 4 shows separate layers for information handling, and the protocols used in the transmission of information between different nodes for respective layers. The names given to the layers SM-TL, SM-RL and SM-LL are shown on the left of FIG. 4. Some of the protocols, SM-TP, MAP/H and SM-RP, used in transmitting data belonging to corresponding function layers have been provided with a notation above the arrows that illustrate in FIG. 4 the flow of information between the nodes involved in the transmission of SC, SMS-gateway, MSC and MS. User information transmitted between the mobile station MS and the SMS-service node SC belongs to the function layer SM-TL.

Transmission of data that belongs to the function layer SM-TL takes place in accordance with the rules for the protocol SM-TP. Each function layer requires the service of the immediately underlying function layer when information is to be sent from one node to another. For instance, the function layer SM-TL obtains the service of the function layer SM-RL which, in turn, uses the service of the function layer SM-LL when an SMS-packet is sent to the receiver through the various nodes of the mobile communications system.

Figure 5:
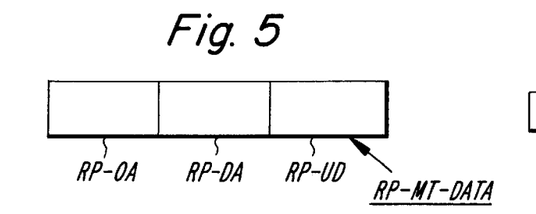
FIG. 5 is a principle diagram illustrating a message word RP-MT-DATA and some of the information fields of said message word.

When the SMS-packet is to be sent, there is created a message word RP-MT-DATA (see FIG. 5) which carries the SMS-packet during its transmission from the SMS-service node SC to the mobile station MS. The message word belongs to the function layer SM-RL. The message word has a number of different information fields, one of which, RP-UD, contains the SMS-packet SMS-deliver with its information field. Data in remaining information fields in the message word RP-MT-DATA is specific to the function layer SM-RL and contains primarily address information. These remaining information fields are read by the nodes through which they pass. The nodes through which the information fields pass can also change the data. For instance, the identity MSISDN of the receiving mobile station arriving at the SMS-gateway can be changed, e.g., to IMSI when it is forwarded by the SMS-gateway 1. These remaining information fields are therewith decoded by the nodes passed by said fields, when the message word is sent in a known manner to the mobile station MS, whereas the information field RP-UD passes the nodes transparently. FIG. 5 illustrates a principle of the message word RP-MT-DATA, wherewith only those information fields that are always switched between the SMS-service node SC, the SMS-gateway 1 and the serving mobile switching centre MSC are shown. One information field RP-OA contains the address of the SMS-service node, and another information field RP-DA contains the address of the mobile station.

When transmitting the message word RP-MT-DATA, different protocols are used between different nodes. The protocol MAP/H is used between the SMS-gateway 1 and the serving switching centre MSC.

The typical transmission of SMS-messages has been described above. The manner in which the present invention functions with the use of the aforedescribed existing functions will now be described. Firstly, it will be described how a command relating to positional determination of a given mobile station can be transferred from a positioning node to the switching centre that serves the mobile station. However, the principle according to which the positioning command is sent to the switching centre can also be used for other types of commands.

The above description made with reference to FIG. 2 illustrating nodes and signalling links involved in the transmission of an SMS-message in a GSM-system can be used to illustrate the following statment. The node MPC, which constitutes a positioning node, functions as a typical SMS-service node SC although with the difference that the messages sent thereby are positioning commands.

The positioning node MPC shown in FIGS. 1 and 2, is located outside the mobile communications system. The positioning node MPC has been drawn in full lines in this case. The positioning node MPC may alternatively form part of the gateway switching centre P. FIG. 2 illustrates in broken lines a positioning node variant where the node is connected to the gateway switching centre P. The services and functions afforded by the positioning node MPC in such cases are the same as though the node MPC was to be located outside the mobile communications system GSM. One difference, however, is that there is no need for open communication protocol between the positioning node MPC and the gateway switching centre P.

The positioning node, MPC in FIG. 1, determines the geographical position of, e.g., the mobile station MS on behalf of the user, e.g. the user A. The user discloses which of the mobile stations MS, MS1, MS2 and MS3 shall be localized, by stating the identity of the mobile station and its MSISDN number. The mobile station MS is chosen in the illustrated case. The positioning node MPC initiates a positioning procedure in the mobile communications system GSM and presents the result of this positioning procedure to the user A.

Upon receiving an order from the user A concerning the location or position of the mobile station MS, the positioning node MPC sends a positioning command to the mobile services switching centre MSC that serves the mobile station MS. The switching centre MSC then proceeds to collect positional data. The procedures followed in the switching centre MSC subsequent to it receiving and identifying the positioning command are not the subject of this patent application. Upon completion of the positioning procedure executed by the switching centre MSC, the switching centre sends the compiled positioning data to the positioning node MPC. The present invention provides a method of sending the data from the switching centre MSC to the positioning node MPC.

Figure 6:
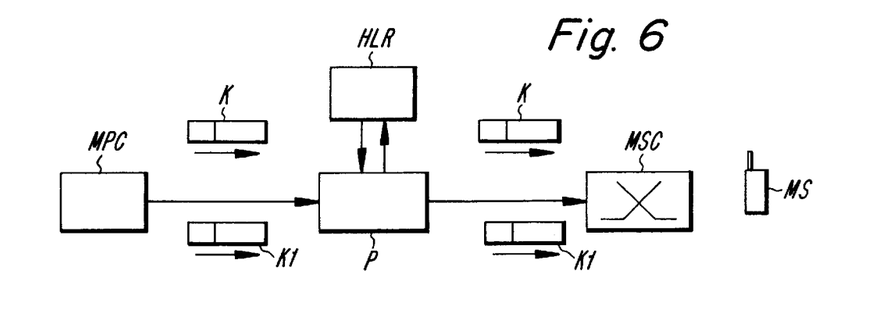
FIG. 6 is a block schematic illustrating the nodes involved in sending a message to a switching centre that serves a designated mobile station.
Figure 7:
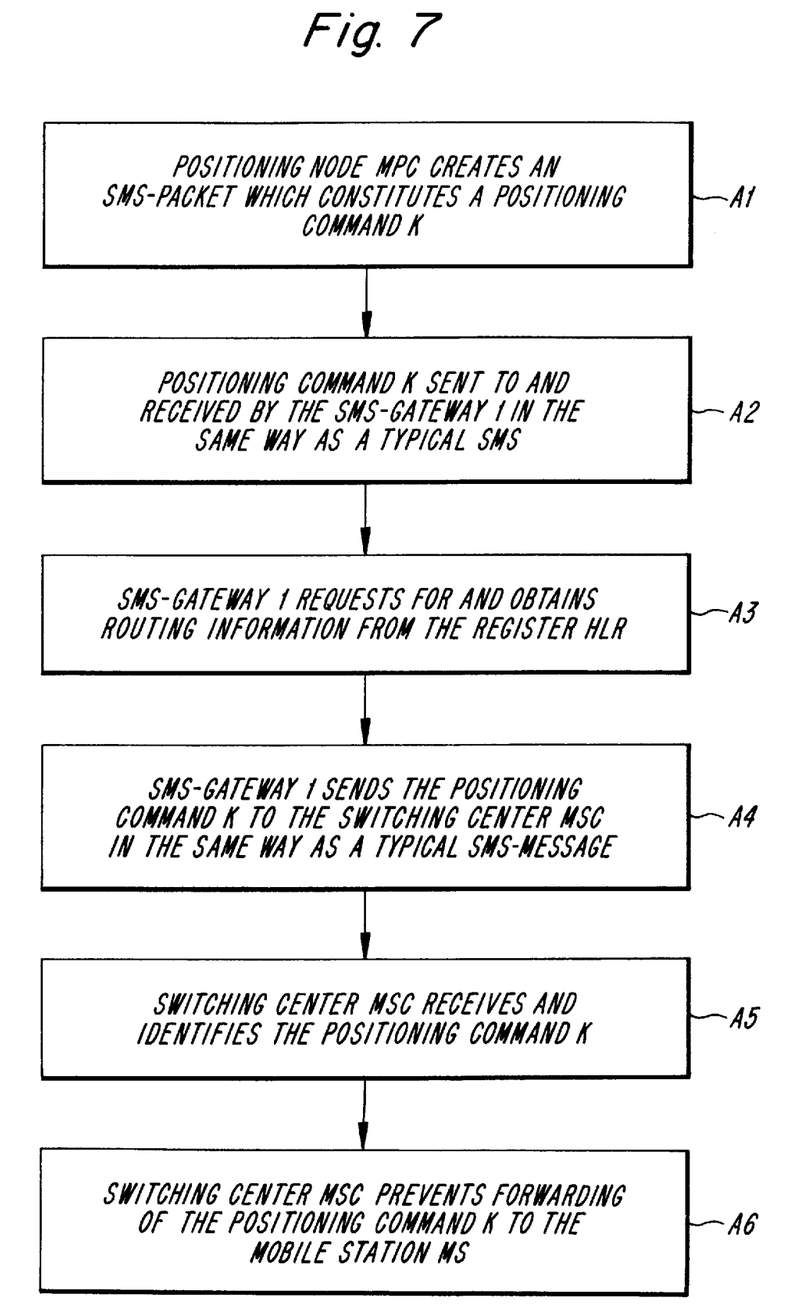
FIG. 7 is a flowchart illustrating the method steps of sending a positioning command from the positioning node to the serving switching centre.

FIG. 6 is a block schematic which illustrates those nodes that are involved in the transmission of the positioning command K to the switching centre MSC, and also illustrates the mobile station MS. FIG. 7 is a flowchart illustrating the simplest embodiment of the method of transmitting a command K concerning the location or position of a given mobile station, from the positioning node to the service centre that serves said mobile station.

According to step A1 of FIG. 7, the positioning node MPC initially creates a positioning command in the same way as the SMS-service node creates the SMS-packet. The positioning command, however, is distinguished from the standard SMS-packet, by virtue of a positioning indication symbol being included in one information field of the SMS-packet.

According to one embodiment, the information field chosen to carry the positioning symbol is the field for user data TP-UD in FIG. 3. The symbol will then preferably be selected to exclude the probability of the sender of a typical SMS-message sending the same symbol to the mobile station MS.

Figure 8:
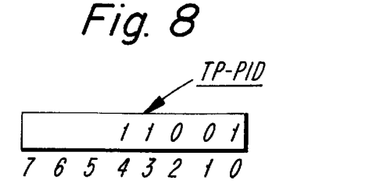
FIG. 8 is a principle diagram illustrating the information field TP-PID.

Alternatively, the symbol for the positioning command K may be a free character that is not normally presented to the mobile subscriber. A free character is included in the information field TP-PID, for instance. This field contains eight bit positions with binary representation. The bit positions from zero up to and including four are used with the symbols from "00000" to "10111" and "11111" for the given purposes; see GSM 03.40 9.2.3.9. The digits in the interval "11000" to "11110" are, on the other hand, available to the SMS-service node SC for free use as characters in the communication with the mobile station MS. One of these numbers, e.g., "11001" can be used to indicate that the message is a command K intended for the switching centre MSC. FIG. 8 shows the information field TP-PID with the number according to this latter example.

Alternatively, the SMS-message can be made to constitute a positioning command, by selecting the symbol "11" in the information field TP-MTI. Similar to TP-PID, the information field TP-MTI forms part of the SMS-packet. TP-MTI consists of two bits with binary representation. As before described, in an SMS-packet, these two bits are set as "00", which indicates that the SMS-packet is an SMS-deliver type message.

The symbols "01" and "10" denote different types of message, while the symbol "11" is not reserved for any given purpose. Consequently, the symbol "11" in the information field TP-MTI is used to distinguish a positioning command K from an earlier known SMS-message.

The positioning command K is sent to the SMS-gateway 1 in the same way as the normal, earlier known SMS-packet SMS-deliver, in accordance with step A2 in FIG. 7 and in FIG. 6. The identity of the mobile station MS is given by its MSISDN number, in the same way as the receiving mobile station is disclosed when sending the earlier known SMS-packet SMS-deliver.

Upon receiving the positioning command K, the SMS-gateway 1 requests routing information form the home location register HLR of the mobile station in the same way as with a typical SMS-packet SMS-deliver. Provided that the home location register HLR contains no information that the mobile station MS cannot be reached, the home location register HLR sends the requested routing information to the SMS-gateway 1 in a known manner. This is shown in step A3 in FIG. 7 and in FIG. 6. The routing information gives the address of the switching centre MSC that serves the mobile station MS. With the routing information obtained, the SMS-gateway 1 forwards the position in command K to the serving switching centre MSC in the same way as a typical SMS-packet, A4 in FIG. 7 and in FIG. 6.

The serving switching centre MSC receives the positioning command K. In order for the switching centre MISC to discover that the signal is a positioning command K, it is necessary for the serving switching centre MSC to decode the information field in the SMS-packet chosen to carry the positioning symbol, for instance the information field TP-PID in FIG. 3. This is carried out in accordance with step A5 in FIG. 7. The serving switching centre MSC is required to manage all incoming SMS-packets, such as the presumptive positioning command K, and to decode the chosen information field in all incoming SMS-packets in order to establish whether or not one of these constitutes a positioning command K.

Subsequent to the serving switching centre MSC having identified the positioning command K, the switching centre prevents further transmission of the positioning command to the mobile station MS and proceeds to determine the position of said mobile station. This procedure is shown in step A6 in FIG. 7.

An alternative embodiment of the invention comprises identification of the SMS-message constituting the positioning command K by the SMS-gateway 1. This embodiment has two advantages. Firstly, it allows forwarding of the positioning command to the serving switching centre MSC to be stopped if, for some reason, the command K should not be executed. Secondly, the SMS-gateway is able to inform the serving switching centre MSC that a forwarded SMS-packet is comprised of a positioning command K. The serving switching centre MSC does not then need to decode the SMS-packet for all incoming SMS-messages.

The simplest solution with respect to the SMS-gateway 1 identifying the SMS-packet that constitutes the positioning command K is that the SMS-gateway 1 decodes the SMS-packet SMS-deliver for all SMS-messages that arrive from outside the system in the same way as the serving switching centre MSC in the earlier embodiment. This solution shifts the problem of identification from the serving switching centre MSC to the SMS-gateway 1 while, at the same time, enabling the aforementioned advantages to be achieved.

On the other hand, when the positioning node is part of the gateway switching centre P, an SMS-message therefrom can be marked directly at a positioning command K.

An alternative, advantageous solution is one in which when the SMS-packet SMS-deliver is sent from one node to another, there is sent at the same time a label which discloses that this packet is a positioning command K. This solution can be applied when the positioning command K is sent from the positioning node MPC outside the mobile communications system GSM to the gateway switching centre P. It can also be applied when the positioning command K is sent from the gateway switching centre P to the serving switching centre MSC. In this solution, the label is comprised of a symbol in one of the information fields in the message word RP-MT-DATA which the receiving node always decodes. RP-MT-DATA is the message word designation used in GSM terminology, but is also used as a reference sign in this document. The receiving node need not therewith carry out more work for typical short messages than was earlier required.

The address of the positioning node MPC is one example of what can form a label for the positioning command K. This presumes that both the gateway switching centre P and the serving switching centre MSC have registered that the positioning node MPC solely sends positioning commands. When either the gateway switching centre P or the switching centre MSC receives an SMS-message and decodes the sender address, i.e. the address of the positioning node MIPC, either the gateway switching centre P or the switching centre MSC will identify that the SMS-message is a positioning command K.

Figure 9:
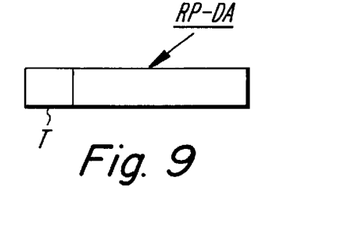
FIG. 9 is a principle diagram illustrating an information field, for instance the information field RP-DA.

The symbol that distinguishes the positioning command K from other SMS-messages can also be placed in another information field of the message word RP-MT-DATA. FIG. 9 is a principle illustration that illustrates the construction of the information fields RP-DA and RP-OA. The fields are headed with a first character T which indicates the type of information that follows in the field. The field RP-DA contains the identify of the receiver. Six numbers ranging from "0" to "5" have been specified for the character T when the character heads the field RP-DA. These specified values of the character T indicate the form in which the identity of the mobile station MS is given, e.g. IMSI or LMSI. The number six or the number seven is chosen as the prefactory character T in the information field RP-DA as the symbol for the positioning code K. The reader is referred to GSM 09.02 for a more detailed description of the information fields and their contents.

Alternatively, the positioning symbol may be found in the prefactory character in the information field RP-OA. The numbers two, four and five are already reserved for other purposes, but the number six for instance may constitute the positioning symbol.

The advantage gained by placing the positioning command symbol in the information field RP-OA or RP-DA is that it breaks with conventional syntax in communication with the serving switching centre MSC. If the switching centre MSC does not realize that it has received a positioning command K, it will treat the message as an error and will not therefore forward the command to the mobile station MS.

The method of transferring a positioning command K from the positioning node MPC to the switching centre MSC can also be used to send other types of commands K1 to the serving switching centre MSC.

An example of a command other than the positioning command is the command K1. It is desirable to be able to transfer to the serving switching centre a command K1 concerning logging of statistics relating to the mobile station. One such command K1 is transferred from a service node N shown in broken lines in FIG. 2.

Interrogation with respect to the manufacturing identity of the mobile station MS is another example of a command K1 from the service node N. Previously, reference to the mobile station has been to the actual mobile station (MS) in the absence of its user identity module, a so-called SIM-card. When the serving switching centre receives and identifies a command K1 with this meaning, the switching centre MSC orders the identity query to be sent to the mobile station. In GSM-terminology, this query is referred to as "Identity Request". The mobile station responds and states the manufacturing identity, including among other things the model and manufacturing serial number. This type of information can be used, for instance, by an operator to establish whether or not a certain make or series of mobile stations function poorly in response to a customer complaint.

In the earlier presentation, no type of command K1 intended for the serving switching centre MSC than the positioning command K was involved. When the switching centre MSC identified a received SMS-message constituted a command K1 intended for the serving switching centre, it also identified indirectly that the command was a positioning command K.

If several different types of command K1 are intended for the serving switching centre MSC, then identification of the command K1 being intended for the serving switching centre MSC and identification of the purport of the command K1 must be seen as two separate problems.

One way of tackling these problems is for the switching centre to first identify the purport of the received command K1. The fact that the command K1 is intended for the serving switching centre MSC is a possible sequence of the purport of the command K1. This means that an own symbol which denotes the type of command must be found for each type of command K1 intended for the serving switching centre MSC. For instance, if a certain information field has been selected in the message word RP-MT-DATA to contain the symbol that denotes command type, the number of command types is restricted by the number of possibilities of varying the symbol in the selected information field. On the other hand, if the address of the sending node has been chosen to form the symbol that discloses the purport of the command K1, the sending node must be specialized to send solely one type of command K1.

A more flexible solution, however, is one in which the mobile switching centre MSC first identifies the fact that an incoming SMS-message constitutes a command K1 intended for the switching centre MSC and thereafter decode the purport or meaning of the command K1. This means that only one symbol need be used to separate the command K1 that are intended for the serving switching centre MSC from earlier known SMS-messages. In order to disclose the meaning of the command K1 more clearly, the standard space for user data in the SMS-packet is used for instance, i.e. the information field TP-UD.

When the serving switching centre MSC receives a command K1, it follows procedures that are not the subject of this patent application. These procedures may involve fetching and putting together data, for instance in a position determining process by the switching centre MSC ordering the propagation delay between the base station BS1, BS2 and BS3 and the mobile station MS to be measured. These procedures may also involve the switching centre MSC processing the information before it forwards the information. In the case of a position determining process for instance, it may be such that the locations or positions of the base stations BS1, BS2 and BS3 must be known in order to enable the position of the mobile station MS to be calculated. It may be so that information relating to the positions of the base stations is not available to the positioning node MPC, either because the mobile communications system operator considers it to be confidential information or also because it is difficult administratively to keep a list of the positions updated. In such a case, it is suitable to partially calculate the position of the mobile station in respect of the switching centre MSC before the switching centre forwards the positional information. This part calculation shall include that part of the position determination to which the positions of the base stations is necessary information, so that these positions need not be revealed. The part calculation can either be carried out in the switching centre MSC or in a node connected to said switching centre.

The manner in which the present invention provides a solution to the problem of sending data from the serving switching centre MSC back to the service node N or to the above-described positioning node MPC will now be described.

The GSM standard describes how the mobile station MS shall react after having received a typical, earlier known SMS-message. The mobile station MS informs the switching centre MSC that it has received the SMS-message, whereupon the switching centre MSC sends an acknowledgement back to the SMS-service node SC to the effect that the message has reached the mobile station MS. The acknowledgement sent by the switching centre MSC is referred to in GSM terminology as SMS-TL SMS-Deliver-Report for RP-ack. The acknowledgement is described by GSM-specification 03.40 9.2.2.1a.

After the serving switching centre MSC has received a command K1 from the service node N or from the positioning node MPC, as described with reference to the preceding embodiment, the switching centre MSC shall initiate transmission of an acknowledgement to the effect that the command K1 has been received back to said node. The acknowledgement shall have the same format as if the transmission had been initiated from the mobile station MS in a normal way.

Figure 10A:
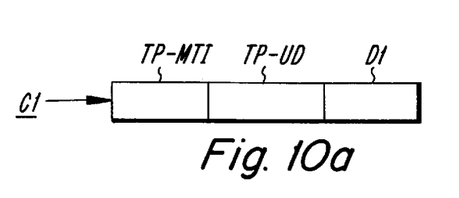
FIGS. 10a and 10b are principle diagram illustrating an SMS-packet used in transmitting from a switching centre to a service node for the short command.

The acknowledgement can be used by the serving switching centre to send data back to the service node N or to the positioning node MPC. FIG. 10a is a principle diagram of the acknowledgement C1. The acknowledgement C1 has a number of different information fields, of which FIG. 10a shows only the information field for user data TP-UD the field TP-MTI that indicates message type and a further information field D1. The information field for user data TP-UD is used in the present invention to transfer data from the serving switching centre MSC to the service node N or to the positioning node MPC. The information field for user data can accommodate up to 140 octets of user data stored with binary representation.

Figure 10B:
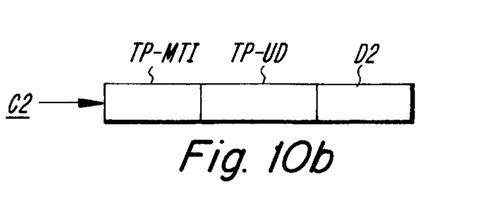

In an alternative embodiment, data is sent from the switching centre MSC to the positioning node MPC or to the service node N in a completely new SMS-message. In GSM terminology, the designation "SM-TL SMS-SUBMIT" is used for a type of SMS-packet that is sent from the mobile station MS to the SMS-service node SC. FIG. 10b is a diagrammatic principle view of this latter SMS-packet C2, and three of its information fields TP-MTI, TP-UD and D2. The information fields TP-MTI and TP-UD in FIG. 10b have the same purpose as the information fields identified by the same reference signs in the aforedescribed acknowledgement C1, whereas the field D2 forms no part of the acknowledgement C1. The packet includes more information fields than those shown in FIG. 10b, all information fields being described in the GSM specification 03.40 9.2.2. The present invention utilizes this latter type of SMS-packet C2 to send data from the serving switching centre MSC to the positioning node MPC or to the service node N. According to the present invention, the SMS-packet C2 is created by the serving switching centre MSC and is sent by the switching centre on its own initiative. This can be compared with the earlier known procedure, in which the SMS-packet C2 is created and transmitted on the initiative of the mobile station MS and in which the switching centre MSC merely forwards the SMS-packet C2. The information field for user data, TP-UD in FIG. 10b, is used in transmitting data from the switching centre MSC to the service node MPC.

This method enables data to be sent to the service node N or to the positioning node MPC even when the serving switching centre MSC has not received a command K1 from the service node MPC in the manner described in the previous embodiment.

Figure 11:
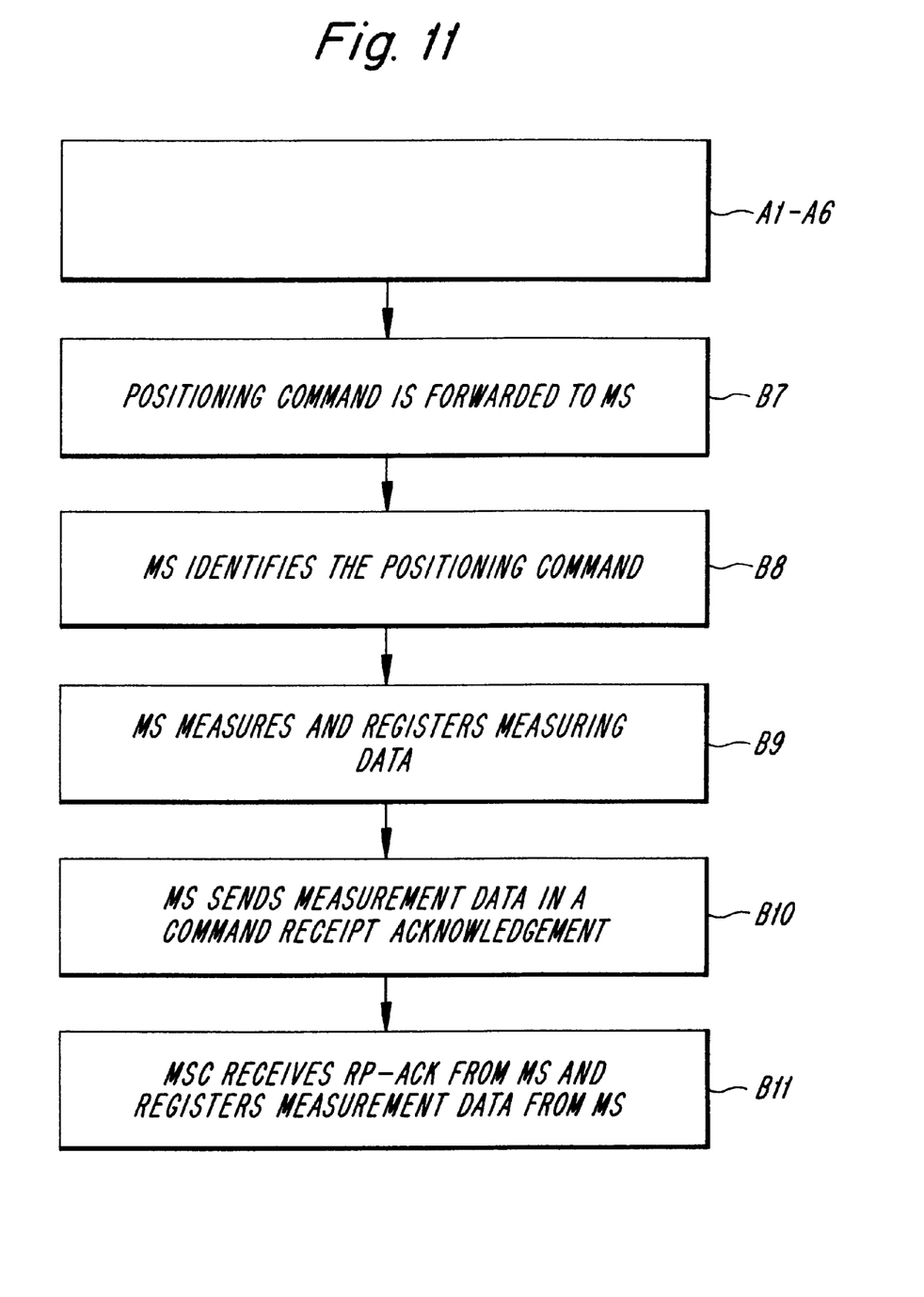
FIG. 11 is a flowchart illustrating the method steps that are carried out in sending a positioning command from the positioning node to the serving switching centre in that case when the positioning command shall also reach the mobile station.

A continuation of the method described in FIG. 7 is shown in FIG. 11. The method in FIG. 11 is intended for application when the positioning process initiated by the switching centre MSC involves the mobile station MS in the measuring process. This may, for instance, apply to methods in which the mobile station MS measures the time delay of a signal sent from one of the base stations BS1, BS2 or BS3 in FIG. 1. The method steps A1–A6 according to FIG. 7 are carried out first in the method shown in FIG. 11. After having identified the positioning command K, the switching centre MSC forwards the positioning command K to the mobile station MS, shown with block B7 in FIG. 11.

The mobile station MS receives and identifies the positioning command K, in accordance with block B8, whereafter it starts the measuring process in accordance with block B9 in FIG. 11.

After having registered measuring data, the mobile station sends this data back to the serving switching centre MSC, according to block B10 in FIG. 11. The measuring data may, for instance, be transferred in an own information field in the message RP-ack belonging to the function layer SM-RL.

After having received the message RP-ack from the mobile station MS, the switching centre MSC registers the measuring data reported by the mobile station in accordance with block B11 in FIG. 11. The switching centre is then supposed to send to the positioning node MPC the acknowledgement that the mobile station MS has received the positioning command K. However, the switching centre MSC can delay transmission of the acknowledgement until the switching centre MSC has had time to process and compile positioning data. This process and compiled positioning data is placed in the acknowledgement information field for user data and transferred to the positioning node together with the acknowledgement.

Even if the switching centre MSC obtains another type of command K1 than a positioning command, it is possible that the switching centre will establish a signalling connection with the mobile station MS in order to execute the procedures given in the command. This will apply, for instance, when the switching centre receives a command K1 which orders the switching centre to establish the type of mobile station MS that is used.

If transmission of the earlier known SMS-message to the mobile station MS is unsuccessful, because the mobile station is not positioned in the service area or because the mobile station has shut down, the SMS-service node will receive a message to this effect. When the mobile station MS switches on or is again positioned within the service area, the SMS-service node will receive a message to this effect and can re-attempt to send the SMS-message.

If the transmission of a command K1 from the service node N or from the positioning node MPC to the switching centre MSC is unsuccessful because the mobile station MS is located outside the service area or has shut down, the service node N or the positioning node MPC will receive a message when the mobile station MS is again available. The service node N or the positioning node MPC can then make a further attempt to send the command K1 to the switching centre MSC.

Figure 12:
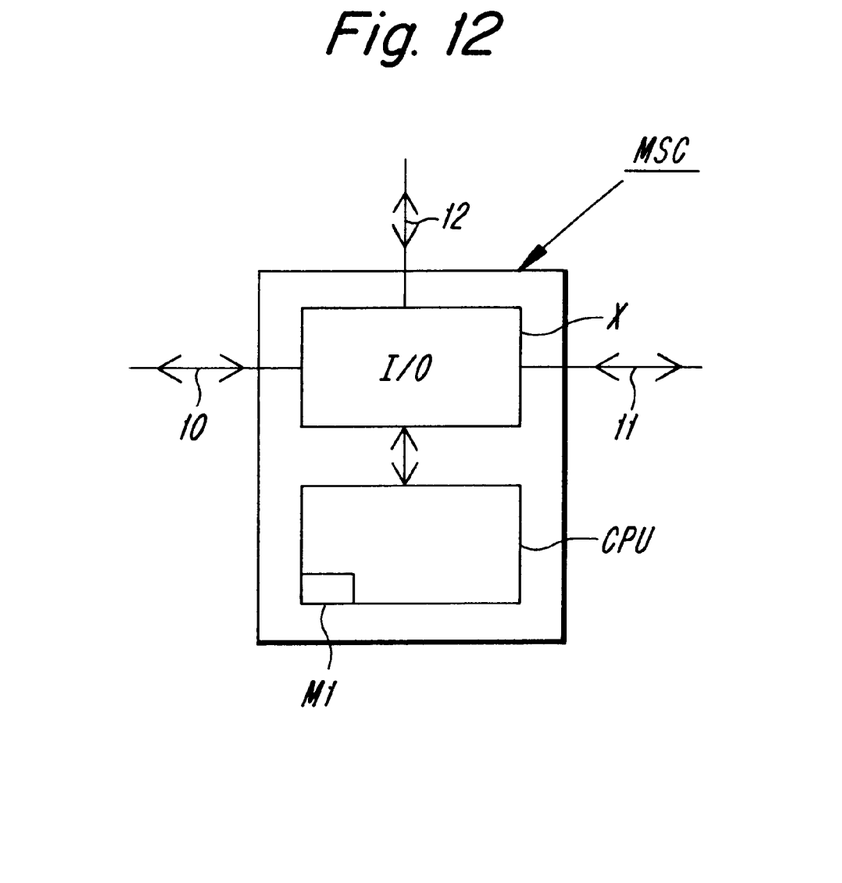
FIG. 12 is a block schematic illustrating a switching centre that has been modified in accordance with the invention.

FIG. 12 is an elementary diagram of the serving switching centre MSC. As is known, the switching centre MSC includes typically a central processor CPU and a signalling unit X through which signals arrive at or depart from the switching centre MSC. The switching centre MSC has, via the signalling unit X, also a connection 10 with the gateway switching centre P, a connection 11 with the base station system, and a connection 12 with the visitor location register VLR. The central processor CPU controls the switching centre MSC. Signalling links are present between the signalling unit X and the central processor CPU. By controlling the signalling unit X, the central processor CPU is able to send signals to nodes outside the switching centre, for instance to the gateway switching centre or to a mobile station via the base station system. The central processor CPU also receives signals from other nodes, via the signalling unit X. The received signals give instructions to the central processor central processor follows the instructions by executing relevant program loops.

So that the serving switching centre MSC will be able to carry out the inventive method, the switching centre is modified by connecting to the central processor CPU a storage unit M1 in which a symbol is stored. When a new short message has reached the switching centre, a symbol in one of the information fields in the incoming message word RP-MT-DATA is compared with the stored symbol. Depending on this comparison, the switching centre MSC establishes that the message is a command K1 intended for the switching centre MSC.

When a command K1 has been identified, execution of a program loop is commenced. The program loop compares the number stored in a designated command information field with other stored numbers, and a further program loop is activated in dependence on the comparison. This further program loop controls the collection and combination of data. The further program loop thereafter controls the creation and transmission of an acknowledgement that the command K1 has been received. The acknowledgement K1 includes the compiled data in one of its information fields.

The switching centre MSC is also provided with a clock and a third program loop which checks the clock time during execution. The third program loop starts the execution of a fourth program loop at certain clock times. This fourth program loop controls the collection and compilation of data and the creation of a new message C2. The fourth program loop also controls the transmission of the new message C2 to the service node SN.

The switching centre msc is provided with further storage spaces for storing the aforedescribed program loops.

What is claimed is:

1. A method of sending a short message in a telecommunications system that includes a mobile communications system, wherein the mobile communications system includes a switching center (SC), a mobile station (MS) which is served by the switching center (SC), a gateway switching center (P) connected to the switching center (SC), a home location register (HLR) connected to the gateway switching center (P), and a short message service node (SN) connected to the gateway switching center (P), the method comprising the steps of:

sending the short messages from the service node (SN) to the gateway switching center (P) in the form of message words that contain information fields;

generating address information that points to said switching center (MSC) and which is transferred from the home location register (HLR) to the gateway switching center (P);

inserting a predetermined symbol in one of the message word information fields, whereby the corresponding short message is pointed out as a command (K) intended for the serving switching center (SC);

sending the command (K) to the gateway switching center (P);

sending the command (K) from the gateway switching center (P) to said switching center (SC) that serves the mobile station (MS);

identifying the predetermined symbol in said field in said switching center (SC);

forwarding the command (K) from the switching center (SC) to said mobile station (MS);

compiling a first set of data in the mobile station; and sending an acknowledgment of the receipt of the command from said mobile station (MS) to said switching center (SC), said first data set being transferred with said acknowledgment.

2. The method of claim 1, further comprising the steps of:

generating one of the short messages in the serving switching center; and sending this short message to the service node (SN).

3. A method of sending a short message in a telecommunications system that includes a mobile communications system, wherein the mobile communications system includes a switching center (SC), a mobile station (MS) which is served by the switching center (SC), a gateway switching center (P) connected to the switching center (SC), a home location register (HLR) connected to the gateway switching centre (P) and a short message service node (SN) connected with the gateway switching centre (P), the method comprising the steps of:

sending the short messages from the service node (SN) to the gateway switching centre (P) in the form of message words containing information fields;

generating address information that points to the switching center (SC) and transferring said address information from the home location register (HLR) to the gateway switching center (P);

inserting a predetermined symbol in one of the information fields in the message word, whereby the corresponding short message is pointed out as a command intended for the serving switching center (SC);

sending the commands to the gateway switching center (P);

sending the command from the gateway switching center (P) to the switching center (SC) that serves said mobile station (MS); and identifying the predetermined symbol in said field in the switching center (SC), whereafter said switching center (SC) prevents forwarding of the command to the intended mobile station (MS).

4. The method of claim 1, wherein the short message service node is located outside the mobile communications system.

5. The method of claim 1, wherein the short message service node is an integral part of the gateway switching center (P).

6. The method of claim 1, wherein the short message has a first group of information fields which have been intended to pass transparently through the switching center (SC) to the mobile station (MS), and wherein the predetermined symbol is inserted in one of the information fields of said first information field group.

7. The method of claim 6, wherein one of the information fields in the first information field group is the field for user data and wherein said symbol is inserted in said user data field.

8. The method of claim 6, wherein the service node (SN) for the serving switching center (SC) is able to create commands that have mutually different significances, wherein after having established that the command (K) is intended for the switching center (SC) itself, the switching center (SC) also decodes the user data information field of the command (K) in order to obtain further instructions.

9. The method of claim 1, wherein the short message has a second group of information fields that include mobile station address information which is read by the switching center (SC) and wherein said symbol is inserted in an information field in this second information field group.

10. The method of claim 9, wherein the service node (SN) of the mobile communications system is known for sending solely commands (K) intended for the serving switching center (SC); and wherein the address of the service node constitutes said symbol.

11. The method of claim 9, wherein said symbol is comprised of a number that can take predetermined values, where one of said values indicates that the message is a command intended for the serving switching center (SC).

12. The method of claim 1, wherein the command (K) to the serving switching center involves determining the geographical position of the mobile station.

13. The method of claim 1, wherein the command to the serving switching center is a query requesting the manufacturing identity of the mobile station (MS).

14. The method of claim 1, wherein the serving switching center (SC) sends an acknowledgment that the command has been received back to the service node (SN) and sends together with said acknowledgment a second set of data that has been compiled by the switching center (SC).

15. The method of claim 14, wherein the acknowledgment has a user data information field and wherein the second set of data is inserted in the user data information field.

16. The method of claim 1, wherein the mobile communications system is the GSM-system.

17. The method of claim 1, further comprising the steps of:

generating one of the short messages in the serving switching center; and sending this short message to the service node (SN).

18. In an arrangement in a telecommunications system including a mobile communications system which further includes a switching center (SC), a mobile station (MS) that is served by the switching center (SC), a gateway switching center (P) that is connected to the switching center (SC), a home location register (HLR) connected to the gateway switching center (P), and a short message service node (SN)

connected with the gateway switching center (P), a method comprising the steps of:

transferring short messages from the service node (SN) to the gateway switching center (P), said short messages being transferred in the form of a message word that contain information fields;

disclosing address information that points to said switching center (SC), said address information being transferred from the home location register (HLR) to the gateway switching center (P); and transferring short messages from the gateway switching center (P) to the switching center (SC) with the aid of said address information, wherein the service node is designed to insert a predetermined symbol in one of the message word information fields, whereby the short message is pointed out as a command (K) intended for the serving switching center (SC) and wherein said switching center (SC) includes means for identifying the predetermined symbol in said field, said means functioning to prevent the command (K) from being forwarded to the designated mobile station (MS).

19. The method of claim 18, further comprising the steps of:

generating one of the short messages in the serving switching center; and sending this short message to the service node (SN).

20. A method comprising the steps of:

a) sending a short message from a service node (SN) to an input gateway (P) of a mobile communications system;

b) generating address information with respect to a designated terminal (MS) and forwarding a the short message;

c) receiving said short message in a node that serves said terminal; and d) identifying a specific symbol in said short message, said short message being prevented from being forwarded to the designated terminal.

21. A method according to claim 20, wherein said specific symbol defines said short message as a command (K) intended for the serving node.

22. The method of claim 20, wherein the short message service node (SN) is located outside the mobile communications system.

23. The method of claim 20, wherein the short message service node (SN) is an integral part of the gateway switching center (P).

24. The method of claim 20, wherein the command (K) to the serving switching center requests determination of the geographical position of the mobile station.

25. A method comprising the steps of:

a) sending a short message from a service node in a mobile communications system;

b) generating address information with respect to a designated terminal and forwarding said short message;

c) receiving said short message in a node that serves said terminal; and d) identifying, at said node, said short message as a command intended for said node.

* * * * *